United States Patent [19]

Kaegebein

[11] 4,317,216
[45] Feb. 23, 1982

[54] BI-DIRECTIONAL FILTER SYSTEM FOR AMPLIFYING SIGNALS IN SEPARATE FREQUENCY BANDS

[75] Inventor: Daniel P. Kaegebein, Depew, N.Y.

[73] Assignee: TX RX Systems, Inc., Angola, N.Y.

[21] Appl. No.: 148,464

[22] Filed: May 9, 1980

[51] Int. Cl.³ .............................................. H04B 3/38
[52] U.S. Cl. ................................. 455/16; 179/170 C; 333/202
[58] Field of Search ............... 455/15, 16; 179/170 C, 179/170 R; 333/202, 208, 212, 227, 230

[56] References Cited

U.S. PATENT DOCUMENTS

| | | | |
|---|---|---|---|
| 1,836,804 | 12/1931 | Kahl | 179/170 C |
| 2,455,711 | 12/1948 | Sziklai | 179/170 R |
| 3,806,813 | 4/1974 | Eller | 455/16 |
| 4,198,600 | 4/1980 | Oguchi et al. | 455/15 |
| 4,241,322 | 12/1980 | Johnson et al. | 333/202 |

OTHER PUBLICATIONS

GTE Lenkurt Sales Brochure, "700F1 RF Repeater".
GTE Lenkurt Technical Summary "700F1 RF Repeater".

*Primary Examiner*—Glen R. Swann, III
*Attorney, Agent, or Firm*—Bean, Kauffman & Bean

[57] ABSTRACT

A two way repeater-amplifier for amplifying one or more signals of a first group propagating in a first direction and one or more signals of a second group propagating in the opposite direction is proposed. The repeater-amplifier utilizes a single amplifier disposed to receive signals from first and second filter networks adapted to pass signals within the first and second groups respectively. Third and fourth filter networks are disposed to receive signals from the output of said amplifier and are adapted to pass signals within the second and first groups respectively. Tuned cables cooperate with the networks to route only the first signals through the first network, the amplifier and the fourth network, while other tuned cables cooperate with the networks to route only the second signals through the second network, the amplifier and the third network.

15 Claims, 5 Drawing Figures

BI-DIRECTIONAL FILTER SYSTEM FOR AMPLIFYING SIGNALS IN SEPARATE FREQUENCY BANDS

TECHNICAL FIELD OF THE INVENTION

The present invention relates to an electrical two way repeater amplifier. More specifically, the present invention relates to an apparatus in which a number of electrical filter networks are arranged in combination with an amplifier for receiving and amplifying two or more signals of different frequencies propagating in different directions. The novel arrangement permits the use of a plurality of high Q cavity filters in combination with a single amplifier to produce a repeater amplifier of improved characteristics. One particularly attractive feature of one embodiment of the repeater amplifier of the present invention is its ability to be readily expanded to accommodate a number of additional signal channels without undue difficulties. Accordingly, the general objectives of the present invention are to provide novel and improved apparatus and methods of such character.

BACKGROUND OF THE INVENTION

Repeater amplifiers of the nature taught and claimed herein find utility in a variety of applications. One such application includes point to point relay systems in which the repeater amplifier amplifies and re-transmits a microwave signal without shifting the frequencies of or otherwise changing the signals. The intermediate link provided by such a repeater amplifier, in combination with a receiving and transmitting antenna, can be utilized to overcome severe shadow losses due to terrain and distance in a microwave communications system. Another practical application for such a repeater amplifier is that of facilitating the penetration of electromagnetic radiation communications into and out of structures such as buildings and tunnels which can not ordinarily be penetrated by electromagnetic radiation broadcast from standard antenna systems.

It is conventional in a standard repeater amplifier to provide at least a pair of amplifiers for handling signals propagating in opposite directions. Each of these amplifiers is accompanied by a filter network which filters out all signals except the signals desired to be amplified. As will be recognized, such an active repeater is rather expensive in that it requires a pair of amplifiers and redundant filtering networks.

One prior art device is known which is capable of using a single broad band amplifier for amplifing the signals of different frequencies propagating in opposite directions. The filtering network which accompanies this prior art device is a complicated and expensive arrangement of bandpass filters, circulators, and isolators.

It is evident therefore that a two-way repeater amplifier which utilizes but a single broad band linear amplifier and a simple inexpensive filter network is desireable and would be especially useful in the context of radio communications systems such as are used by municipal police and fire departments. An additional and particularly attractive use is found in underground mine communication systems which require two-way repeater amplifiers to amplify the communication signals at periodic intervals along the mine passageways. Another application is in a nuclear reactor facility where a communications system must penetrate extremely thick walls of concrete and steel. The repeater-amplifier of this invention is useful here in combination with a Radiax cable to penetrate the containment building and to control the signal levels.

THE INVENTION

The novel two-way amplifier of the present invention avoids the defects and deficiencies of the prior art repeater amplifiers while significantly reducing the cost thereof. It does so by utilizing a novel approach which takes advantage of the unique characteristics and properties of either a three port or a four port bandpass filter. These unique three port and four port bandpass filters are fully disclosed and described in my copending patent application Ser. No. 013,363 filed Feb. 21, 1979 entitled, "Cavity Filter and Multicoupler Utilizing Same".

The subject two-way repeater amplifier amplifies one or more signals of a first group propagating in a first direction and one or more signals of a second group propagating in the opposite direction. The device utilizes a signal amplifier disposed to receive signals from first and second filter networks adapted to pass signals within the first and second groups respectively. Third and fourth filter networks are disposed to receive signals from the output of the amplifier and are adapted to pass signals within second and first bands respectively. Tuned cables cooperate with the networks to route only the first signals through the first network, the amplifier and the fourth network, while other tuned cables cooperate with the networks to route only the second signals through the second network, the amplifier and the third network.

In an embodiment which uses the previously mentioned three port or four port bandpass filters, the filter networks and therefore the repeater amplifier constructed therefrom, are readily expandable by the simple expedient of disconnecting cables, inserting a new channel and connecting additional cables. This feature is a significant advantage, especially where the user anticipates increased signal traffic to be handled by the communications system and the repeater amplifier.

In a second embodiment, the filter networks comprise one or more conventional bandpass filters. In this embodiment, the filter networks of the repeater amplifier are connected one to another by a number of transformer cables, and are arranged such that the signals having given frequencies travel a path different from those signals having different frequencies.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE BEST MODE OF THE INVENTION

Figure 1:
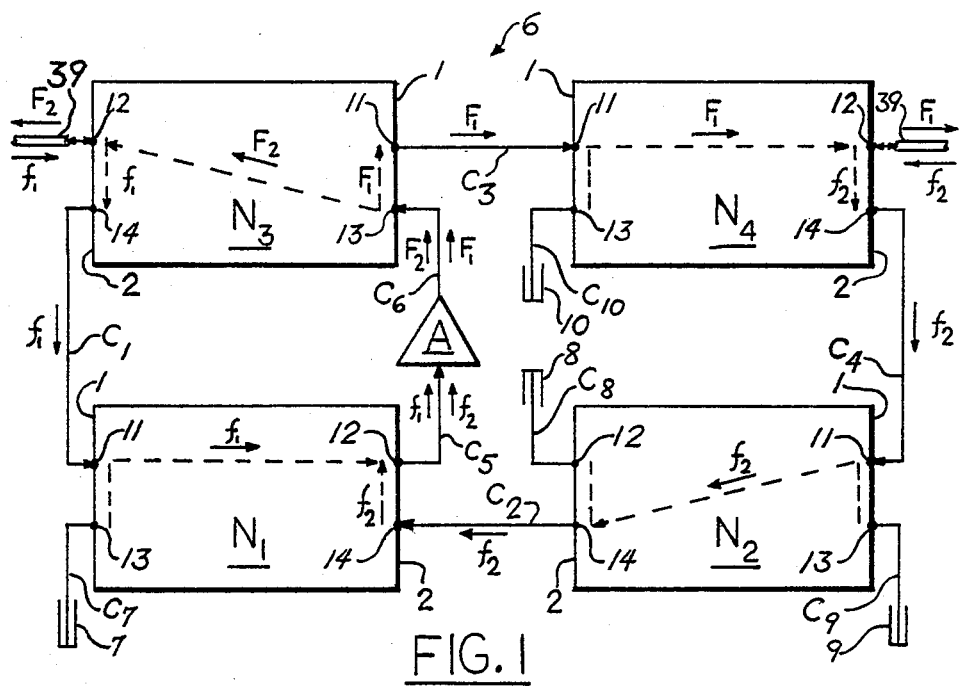
FIG. 1 illustrates a preferred embodiment of the repeater amplifier of the invention which is assembled from a plurality of four terminal networks.

While the invention is susceptible of various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalents.

Figure 2:
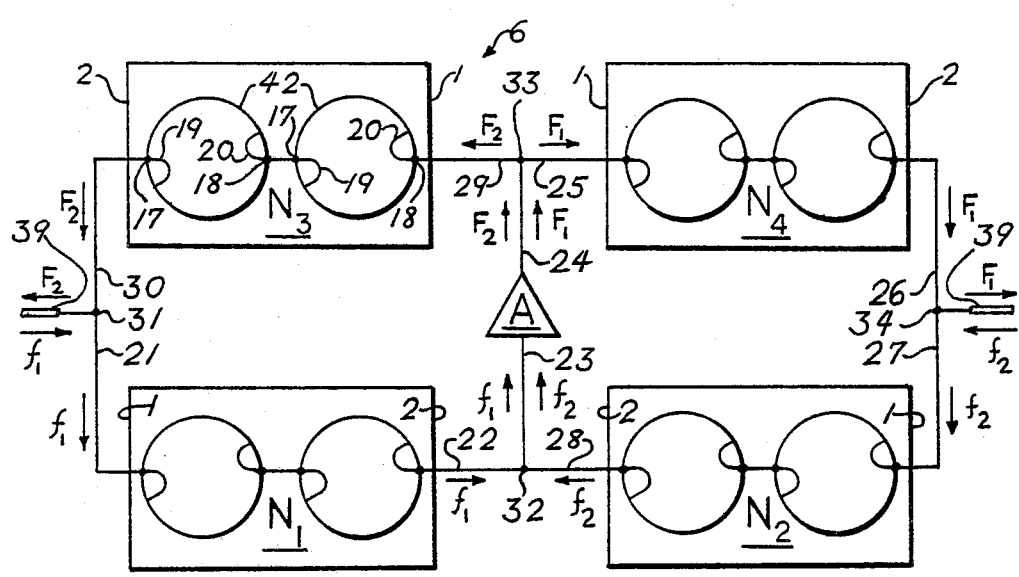
FIG. 2 illustrates another embodiment of the repeater amplifier of the invention which includes a plurality of two terminal filter networks.

The two fundamental embodiments of the two-way repeater amplifier of the present invention are illustrated generally by numeral 6 in FIGS. 1 and 2. Each of these repeater amplifiers is adapted to be inserted in series in a signal carrying transmission line 39 and are properly called "two-way" due to their ability to receive and amplify two groups of signals propagating in opposite directions along the transmission line 39: each group of signals falling within mutually exclusive first and second frequency bands. While each group of signals may include one or more signals of different frequencies within the band, for purposes of clarity, this description will hereafter refer to only two sets of signals (signals with frequencies designated $F_1$ and $F_2$). As can be seen from FIGS. 1 and 2, signals having frequencies $F_1$ are shown as propagating to the right while signals having frequencies $F_2$ are shown as propagating to the left.

The two-way repeater amplifier 6 generally includes an amplifier A and four filter networks designated $N_1$, $N_2$, $N_3$ and $N_4$ respectively. Filter networks $N_1$ and $N_2$ are disposed to receive and pass the unamplified incoming signals $F_1$ and $F_2$ respectively, and to deliver the unamplified signals to the input of the amplifier A. Filter networks $N_3$ and $N_4$ are disposed to receive the amplified signals $F_2$ and $F_1$ respectively and to pass these amplified signals back into the transmission lines in the direction in which they were originally propagating.

In order to make the meaning of FIGS. 1 and 2 clearer, unamplified signals have been designated by the lower case "f" and amplified signals have been designated by the upper case "F". It should be understood, however, that $f_1$ and $F_1$ (as well as $f_2$ and $F_2$) are the same signals differing only by their relative amplitudes. Therefore, hereinafter, the written specification follows the convention of using only upper case F's when the frequency of a signal is noted.

Generally speaking, the filter networks N function as bandpass filters which pass only those signals having the frequencies to which the networks have been tuned and excluding all others. Tuned or critical length cables are provided in each of the embodiments to cooperate with the respective filter networks to provide their band pass and reject characteristics. As can be seen from an examination of FIGS. 1 and 2, filter networks $N_1$ and $N_4$ pass signals having frequency $F_1$ while rejecting signals having frequency $F_2$, while networks $N_2$ and $N_3$ pass signals having frequency $F_2$ while rejecting signals having frequency $F_1$.

Turning now to a closer examination of FIG. 1, it can be seen that each of the filter networks $N_1$–$N_4$ have first and second ends labeled 1 and 2 respectively at which are located two network terminals or ports 11,13 and 12,14. Accordingly, the filter networks of the embodiment in FIG. 1 may be characterized as being "four terminal filter networks". Tracing the path of signals having frequency $F_1$, it can be seen that the transmission line 39 is connected to terminal 12 at the second end of network $N_3$. Since network $N_3$ is tuned to pass only signals having frequency $F_2$, the $F_1$ signal is rejected and shunted to terminal 14 as shown by the dotted line at the left end of $N_3$. The rejected signal then passes through tuned cable $C_1$ to the input terminal 11 of filter network $N_1$.

Network $N_1$ is tuned to pass signals having frequency $F_1$ so that the signal successfully passes through the network to terminal 12 from which it propagates to the input of amplifier A through cable $C_5$. Amplifier A amplifies the signal which then delivers it via cable $C_6$ to input terminal 13 at the first end of network $N_3$.

Since network $N_3$ is tuned to pass only signals having frequencies $F_2$, the amplified signal $F_1$ is rejected by the network and is diverted to terminal 11 from which it propagates through tuned cable $C_3$ to input terminal 11 at the first end of network $N_4$. Network $N_4$ is also tuned to pass signals of frequency $F_1$ so that the signal successfully traverses the network to terminal 12 from which it is able to pass in an amplified condition back into transmission line 39 in the same direction that it was originally traveling.

Signals having frequencies $F_2$ and propagating in the opposite direction are shown entering the system from the right through transmission line 39 at terminal 12 of network $N_4$ and are immediately rejected by network $N_4$ to terminal 14 from which it propagates through tuned cable $C_4$ to input terminal 11 at the first end of network $N_2$. Network $N_2$ is tuned to pass signals having frequency $F_2$ so that the signal traverses the network successfully to terminal 14 at the network's second end from which it propagates through tuned cable $C_2$ to terminal 14 of network $N_1$. Network $N_1$ is unable to pass signals having frequency $F_2$ so that the signal is then diverted to terminal 12 of network $N_1$ from which it passes through cable $C_5$ to the input of amplifier A, is amplified, and passes subsequently through cable $C_6$ in its amplified condition to input terminal 13 at the first end of network $N_3$. As previously mentioned, network $N_3$ is tuned to pass signals having frequency $F_2$ so that the signal successfully traverses network $N_3$ to terminal 12 from which it reenters the transmission line 39 in an amplified condition and continues its way along the transmission line in the same direction that it originally entered the repeater amplifier system.

Figure 3:
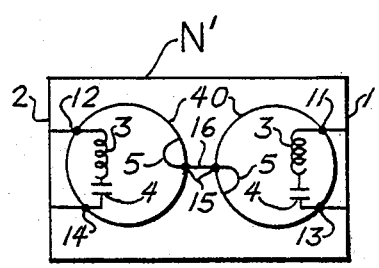
FIGS. 3, 4 and 5 illustrate a variety of design alternatives for the four terminal filter networks utilized by the embodiment illustrated in FIG. 1.
Figure 4:
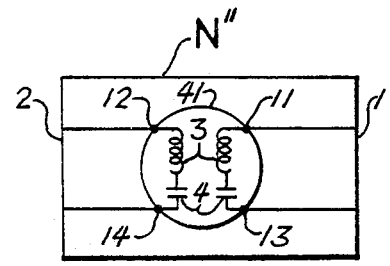
Figure 5:
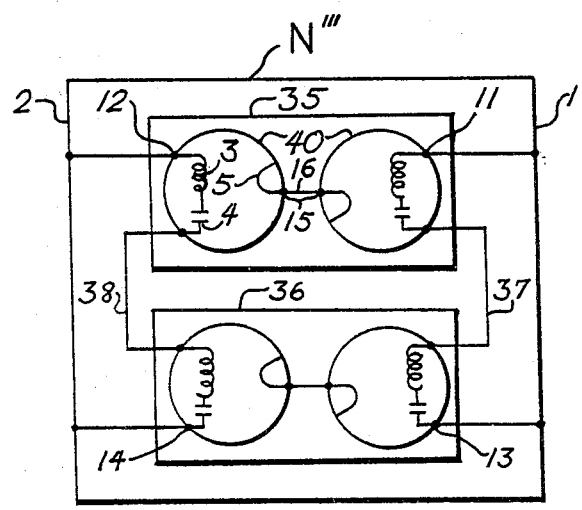

For a more complete and thorough understanding of the operation of the embodiment of the two-way repeater amplifier 6 shown in FIG. 1, it is now necessary to consider further the details of the "four terminal filter networks" $N_1$–$N_4$ utilized by the embodiment of FIG. 1. FIGS. 3, 4 and 5 show three different possible alternatives for the design of the four terminal filter networks. Each of the alternative filter networks N', N", N''' shown in FIGS. 3, 4 and 5 respectively, are assembled from one or more cavity filters which have been illustrated and described in U.S. Pat. No. 4,249,147 by Daniel P. Kaegebein entitled, "Cavity Filter and Multicoupler Utilizing Same", issued Feb. 3, 1980, the contents of which is hereby incorporated by reference.

The network N' is composed of two "three port bandpass cavity filters" 40. The three ports or electrical terminals are designated in FIG. 3 as 12, 14, and 15.

Between ports 12 and 14 there is connected a series reactive circuit which includes at least an inductor 3 inductively coupled to the interior of the cavity filter 40 and preferably also a capacitor 4 connected in series with the inductor 3. The serially connected inductor 3 and capacitor 4 are otherwise electrically insulated from the walls of filter cavity 40 which is tuned to resonate at the pass frequency of the filter and thus of the network. Port 15 is connected to a conventional loop 5 which is electrically connected to the interior of filter cavity 40 and which is also inductively coupled with the interior of the cavity. Two of these "three port bandpass cavity filters" are connected back to back by a critical length of tuned cable 16 between their respective ports 15 in a conventional manner. As can be seen, the reactive circuit of this second cavity filter is serially connected between ports or terminals 11 and 13.

The lines in the figure which extend from terminals 12, 14, 11 and 13 to the rectangular boundry, represent portions of the connecting cables of the repeater amplifier 6 illustrated in FIG. 1 and do not actually comprise a portion of the network itself. It should be noted that reactive circuits comprising inductor 3 and capacitor 4 are asymmetrical and may be reversed depending upon the requirements of the particular application. Furthermore, it should be recognized that the reactive circuit located on the interior of cavity 40 may alternatively include an inductor positioned between a pair of capacitors or a capacitor positioned between a pair of inductors. A further possible alternative is an inductor alone without the accompanying capacitor.

Turning now to an examination of FIG. 4, a network N" is disclosed which comprises at least one "four port bandpass cavity filter" 41. Filter 41 differs from the previously described filter 40 in that the coupling loop 5 which was electrically connected to the interior of cavity 40 has been replaced by a reactive circuit which couples with the field interior to cavity 41 but which is otherwise electrically insulated from the walls of the cavity. Once again, the lines extending from the cavity ports 12, 14, 11 and 13 away from the cavity mearly illustrate the cables as connected in the embodiment of FIG. 1 and do not actually comprise a portion of the network.

FIG. 5 discloses a network N''' which includes two channels 35 and 36 which independently function as bandpass filters for signals of different frequencies within the same frequency band. These channels may consist of either the network N' shown in FIG. 3 or N" shown in FIG. 4. Channels 35 and 36 are connected to one another in a quasi-parallel arrangement by tuned cables 38 and 37. Network N''' may be used in the embodiment shown in FIG. 1 in the event that a number of signals having different frequencies but within the same frequency band are propagating in transmission line 3 in the same direction. For example, if two signals of different frequencies but within the same frequency band were traveling from the left to the right in the illustration of FIG. 1, then it may be appropriate for networks $N_1$ and $N_4$ to include a pair of channels 35 and 36 as shown in the network N''' of FIG. 5 so that each of the signals could be separated and handled individually. In an extension of these concepts, if three or more signals of different frequencies but within the same frequency band are propagating in the same direction, the network N''' of FIG. 5 can readily be expanded by the inclusion of additional channels similar to channels 35 and 36 in a similar quasi-parallel arrangement.

Returning now to consideration of FIG. 1, let's suppose that the networks are all of the type shown in FIG. 3. Considering network $N_3$, it should be recognized that since network $N_3$ is designed to pass signals having frequency $F_2$, the bandpass cavity filters 40 are tuned to resonate at frequency $F_2$. When signal $F_1$ arrives at terminal 12 from the left, cavity 40 of network $N_3$ is not excited to resonate so that the energy of the signal fails to bridge between the inductor 3 and the coupling loop 5 but continues to propagate down the only available path. Thus the signal passes through indicator 3, across capacitor 4, out through terminal 14, and into cable $C_1$, by which means it is delivered to the first end of network $N_1$. At network $N_1$, the resonant frequency of the cavity filter 40 matches the frequency of signal $F_1$ so that the cavity resonates to permit the energy to propagate into and across the cavity where it is picked up by coupling loop 5 and delivered through terminal 15 and critical length tuned cable 16 to the neighboring bandpass filter of the network.

It should be remembered that the reactive circuit within these cavity filters are electrically insulated from the cavity walls. That being the case, one would expect a portion of the energy propagating from network $N_3$ to network $N_1$ in cable $C_1$ to continue out of the network through terminal 13. However, terminal 13 has been connected as shown in FIG. 1 to a tuned length of cable $C_7$ which terminates in a reactive stub 7. As taught in the previously referenced copending patent application Ser. No. 013,363, stub 7 and cable $C_7$ function to reflect and create an effective short circuit condition at substantially the location of terminal 13 for signals having frequency $F_1$. This being the case, the reactive circuit in the left hand filter 40 of network $N_1$ performs as if it were electrically grounded to the interior of the cavity so that virtually the entire energy of the signal having frequency $F_1$ is radiated into the cavity and picked up by the coupling loop 5 for transmission through the cavity.

If stub 7 is a short circuit type, then to operate properly, cable $C_7$ should have a length which places the stub an effective electrical distance away from terminal 13 which is substantially equal to a multiple of a half wavelength of the frequency of the signal $F_1$ or of the mean frequency of the band in which the signal $F_1$ lies. If stub 7 is an open circuit type, cable $C_7$ should have a length which places the stub 7 an effective electrical distance from terminal 13 substantially equal to an odd multiple of a quarter wavelength of the associated channel frequency.

As can be seen in FIG. 1, stub 7 is electrically associated with terminal 13 of network $N_1$ and terminal 14 of network $N_3$. Network $N_3$ is tuned to pass signals having frequencies equal to $F_2$. Accordingly, in order for the left hand cavity filter 40 of network $N_3$ to operate properly, the length of cable $C_1$ should be chosen so that terminal 14 of network $N_3$ is spaced an effective electrical distance from stub 7 which is substantially equal to an odd multiple of a quarter wavelength of the signals having frequency $F_2$ for an open circuit termination stub 7 or a multiple of a half wavelength of the signals having frequency of $F_2$ for a short circuit termination stub 7. It should be noted that the effective electrical distance mentioned above for the left hand cavity filter 40 of network $N_3$ includes the electrical lengths of cable $C_1$, $C_7$, and the reactive circuit of the left hand cavity filter of network $N_1$ between terminals 11 and 13.

From the above discussion the operation of the remaining portions of the two-way repeater amplifier shown in the embodiment of FIG. 1 should become evident. It should be noted that each end of each of the networks $N_1$–$N_4$ is associated with a stub 7, 8, 9, or 10 so that each of the cavity filters 40 in each of the networks is also associated with a termination stub. Specifically, stub 7 is associated with terminals 13 of network $N_1$ and 14 of network $N_3$ via cables $C_7$ and $C_1$. Termination stub 8 is associated with terminal 12 of network $N_2$ and terminal 14 of network $N_1$ via cables $C_8$ and $C_2$. Termination stub 10 is associated with terminal 13 of network $N_4$ and terminal 11 of network $N_3$ via tuned cables $C_{10}$ or $C_3$. And finally, termination stub 9 is associated with terminal 13 of network $N_2$ and terminal 14 of network $N_4$ via tuned cables $C_9$ and $C_4$. In all of these cases, the cables are chosen to have lengths such that the conditions are created which are appropriate for the reflection of a "floating" R.F. short circuit condition at each of the recited terminals for the appropriate signal frequencies and wave lengths of each of the respective networks. Furthermore, when either of the pair of networks $N_1$, $N_4$, or $N_2$, $N_3$ has a design which includes a plurality of channels such as shown in the network $N'''$ of FIG. 5, the critical length conditions must also be observed for each of the channels in the network in order to secure proper operation of the three or four port bandpass filters of the networks. In the circumstance in which a network includes a plurality of channels in order to handle a number of signals having different frequencies within the same frequency band, it may be appropriate for the tuned cables to have lengths dependent upon the mean frequency of the band rather than upon the individual frequency to which an individual channel may be tuned.

Consideration is now turned to FIG. 2 in which a second embodiment of the two-way repeater amplifier 6 of the present invention is illustrated. In this embodiment however filter networks $N_1$, $N_2$, $N_3$ and $N_4$ include one or more channels composed of conventional two port bandpass filters 42 having opposite ports 17 and 18 connected respectively to conventional coupling loops 19 and 20. Each of the bandpass filters is tuned to resonate at a frequency substantially equal to the frequency which the network is designed to pass.

Again looking first at the path followed by signals of frequency $F_1$, the signal originates from transmission line 39 and enters the repeater amplifier at junction 13. At this point, the signal has two possible paths: either through cable 30 or cable 21. In the illustrated repeater amplifier, the networks $N_1$ and $N_4$ are tuned to pass signals having frequency $F_1$ so that the appropriate path for the signal to follow is through cable 21. In order to get the signal having frequency $F_1$ to travel down cable 21 but not cable 30, the length of cable 30 plus the effective electrical length of coupling loop 19 in bandpass filter 42 of network $N_3$ is selected to be substantially equal to an odd multiple of a quarter wavelength of the signal having frequency $F_1$. When this condition is met, the tuned cable 30 in cooperation with the network $N_3$ causes a high impedance to appear at junction 31 to signals having frequency $F_1$ so that the signal is effectively blocked from that path of propagation.

Following the signal having frequency $F_1$ further, it progresses through tuned cable 21, through network $N_1$ which has been tuned to pass signals having frequency $F_1$, and through tuned cable 22 to junction 32. At this point, the signal also has a choice of paths through either tuned cable 28 or untuned cable 23. Since it is desired to force the signal down untuned cable 23 rather than permitting it to propagate down cable 28, cable 28 is also selected to have an effective electrical length along with the joined coupling loop, substantially equal to an odd multiple of a quarter wave length of the signal having frequency $F_1$. After having been amplified by the amplifier A and passing through untuned cable 24, the signal sees similar branching conditions at junctions 33 and 34 so that cables 29 and 27 along with their respective connected coupling loops are chosen to have effective electrical lengths also substantially equal to an odd multiple of a quarter wavelength of the signal having frequency $F_1$. Accordingly, cables 30, 28, 29 and 27 all function as transformers to create high impedances to signals having frequency $F_1$ so as to reject such signals and to force such signals to be routed successively through network $N_1$, amplifier A, and network $N_4$ before returning to the transmission line 39.

By the same token, signals having frequency $F_2$ propagating in transmission line 39 from the right to the left, are forced to be routed through network $N_2$, amplifier A, and network $N_3$ back to the transmission line 39 by critical length cables 26, 22, 25, and 21 all of which are chosen to have effective electrical lengths, along with the connected coupling loop of the adjoining bandpass cavity filters, substantially equal to an odd multiple of a quarter wave length of the signal having frequency $F_2$.

It should be recognized that the embodiment shown in FIG. 2 may also be expanded by providing a plurality of filter channels in the networks. In such a case, the channels within a network, would each be connected to a common junction by critical length cables according to the principles discussed above.

I claim:

1. A two-way repeater amplifier for amplifying one or more signals of a first group propagating in a first direction and one or more signals of a second group propagating in the opposite direction, said signal groups each falling within a mutually exclusive first or second frequency band, said repeater amplifier including:
   a. an amplifier for amplifying both said first and second groups of signals;
   b. first and second filter networks disposed to feed signals to the input of said amplifier, said first network adapted to pass signals within said first band and said second network adapted to pass signals within said second band;
   c. third and fourth filter networks disposed to receive signal from the output of said amplifier, said third network adapted to pass signals within said second band and said network adapted to pass signals within said first band; said repeater amplifier characterized by:
   d. means for routing said first signals through said first network, said amplifier and said fourth network, and for routing said second signals through said second network, said amplifier and said third network, said routing means including a plurality of tuned cables cooperating with said networks to pass said first signals through said first and fourth networks, to pass said second signals through said second and third networks, to block said first signals from passing through said second and third networks, and to block said second signals from passing through said first and fourth networks.

2. A two-way repeater amplifier as recited in claim 1 wherein each of said networks have first and second ends and said plurality of tuned cables are characterized by including:
   a. first cable means connecting the second end of said third network with the first end of said first network for transmitting signals rejected by said third network to said first network;
   b. second cable means connecting the second end of said second network to the second end of said first network for transmitting signals passed by said second network to said first network;
   c. third cable means connecting the first end of said third network to the first end of said fourth network for transmitting signals rejected by said third network to said fourth network;
   d. fourth cable means connecting the second end of said fourth network to the first end of said second network for transmitting signals rejected by said forth network to the first end of said second network;
   e. fifth cable means connecting the second end of said first network to the input of said amplifier for transmitting signals passed by said first and second networks to said amplifier; and
   f. sixth cable means connecting the output of said amplifier to the first end of said third network for transmitting signals amplified by said amplifier to the first end of said third network.

3. The two-way repeater amplifier as recited in claim 2 characterized in that said third and fourth networks each have an electrical connecter at their respective second ends for connection respectively with first and second signal transmission lines, whereby said repeater-amplifier may be connected in series between said first and second signal transmission lines.

4. The two-way repeater amplifier as recited in claim 2 characterized by including:
   a. means electrically associated with the first end of said first network and with the second end of said third network via said first cable means for creating an effective short condition at said first end of said first network and at said second end of said third network for said first and second bands of frequencies respectively;
   b. means electrically associated with the first end of said second network and with the second end of said fourth network via said fourth cable means for creating an effective short condition at said first end of said second network and at said second end of said fourth network for said second and first bands of frequencies respectively;
   c. means electrically associated with the second end of said second network and with the second end of said first network via said second cable means for creating an effective short condition at said second end of said second network and at said second end of said first network for said second and first bands of frequencies respectively; and
   d. means electrically associated with the first end of said fourth network and with the first end of said third network via said third cable means for creating an effective short condition at said first end of said fourth network and at said first end of said third network for said first and second bands of frequencies respectively.

5. The two-way repeater amplifier as recited in claim 2 characterized in that at least two of said networks includes a plurality of distinct filter channels each having first and second ends, each of said plurality of distinct channels having their first ends serially connected to one another and having their second ends serially connected to one another, each of said plurality of channels adapted to pass signals of substantially one frequency within said respective band of frequencies and to reject all other signals.

6. The two-way repeater amplifier as recited in claim 2 characterized in that at least one of said networks includes at least one channel comprising:
   a. a cavity resonator tuned to be resonant at the frequency of said channel;
   b. first and second series lumped constant reactive circuits which each include a series connected inductive loop, at least a portion of each of which is disposed within said cavity resonator so as to inductively couple with the field within said resonator, each of said reactive circuits being otherwise electrically insulated from said cavity resonator and each reactive circuit having first and second ends for series connection in a transmission line; and
   c. means electrically associated with each of said reactive circuits for creating an effective short circuit condition between said respective reactive circuit and ground for the frequency of said channel.

7. The two-way repeater amplifier as recited in claim 2 characterized in that at least one of said networks includes at least one channel comprising first and second bandpass filters which each include:
   a. a cavity resonator tuned to be resonant at the frequency of said channel;
   b. a series lumped constant reactive circuit which includes a series connected inductive loop, at least a portion of which is disposed within said cavity resonator so as to inductively couple with the field within said resonator, said reactive circuit being otherwise electrically insulated from said cavity resonator and having first and second ends for series connection in a transmission line;
   c. coupling loop means electrically connected at one of its ends to the interior of said cavity for inductively coupling with the interior of said cavity; and
   d. means electrically associated with each of said reactive circuits for creating an effective short circuit condition between said respective reactive circuit and ground for the frequency of said channel.

8. The two-way repeater amplifier as recited in claim 7 characterized in that said coupling loop means of each of said first and second bandpass filters are electrically connected one to another via a tuned length of transmission line.

9. The two-way repeater amplifier as recited in claim 4 characterized in that at least one of said means for creating an effective short condition comprises a length of transmission line terminating in an open circuit, said open circuit being spaced from the position of said effective short condition at a respective network by an effective electrical distance substantially equal to an odd multiple of a mean quarter wavelength of the signal group passed by said respective network.

10. The two-way repeater amplifier as recited in claim 4 characterized in that at least one of said means for creating an effective short condition comprises a length of transmission line terminating in a short circuit, said short circuit termination being spaced from the position of said effective short condition at a respective network by an effective electrical distance substantially equal to a multiple of a mean half wavelength of the signal group passed by said respective network.

11. The two-way repeater amplifier as recited in claim 2 characterized by including at least one means electrically associated with one of said networks for creating an effective short condition at said one of said networks for the passed signal group.

12. The two-way repeater amplifier as recited in claim 1 wherein said plurality of tuned cables are characterized by including:
 a. first and second cables coupling said first and second networks to the input of said amplifier at a common junction;
 b. third and fourth cables coupling said third and fourth networks to the output of said amplifier at a common junction;
 c. fifth and sixth cables coupling said transmission line to said first and third networks at a common junction;
 d. seventh and eigth cables coupling said transmission line to said second and fourth networks at a common junction, said first, fifth, fourth, and eigth cables each having lengths substantially equal to an odd multiple of a quarter wavelength of said second signal group and said second, seventh, third and sixth cables each having a length substantially equal to an odd multiple of a quarter wavelength of said first signal group, whereby each cable causes a high impedance to appear at its respective junction for signals having frequencies corresponding to wavelengths related to the lengths of the respective cables.

13. A two-way repeater amplifier as recited in claim 1 characterized in that one of said networks includes a three port bandpass filter.

14. A two-way repeater amplifier as recited in claim 1 characterized in that one of said networks includes a four port bandpass filter.

15. A two-way repeater amplifier as recited in claim 12 characterized in that one of said networks includes a two port bandpass filter.

* * * * *

UNITED STATES PATENT AND TRADEMARK OFFICE
CERTIFICATE OF CORRECTION

PATENT NO. : 4,317,216
DATED : February 23, 1982
INVENTOR(S) : Daniel P. Kaegebein It is certified that error appears in the above-identified patent and that said Letters Patent are hereby corrected as shown below:

Col. 1, lines 11 & 50 - "amplifing" should be --amplifying--.
Col. 5, line 19 - "boundry" should be --boundary--.
Col. 5, line 41 - "mearly" should be --merely--.
Col. 7, line 48 - "13" should be --31--.
Col. 8, line 52 - "signal" should be --signals--.
Col. 8, line 54 - Before "network", please insert --fourth--.
Col. 9, line 20 - "forth" should be --fourth--.
Col. 12, lines 1 & 3 - "eigth" should be --eighth--.

Signed and Sealed this

Fourth Day of May 1982

[SEAL]

Attest:

GERALD J. MOSSINGHOFF

Attesting Officer

Commissioner of Patents and Trademarks